United States Patent [19]

Becker

[11] Patent Number: 5,004,036

[45] Date of Patent: Apr. 2, 1991

[54] METHOD FOR MAKING METAL MATRIX COMPOSITES BY THE USE OF A NEGATIVE ALLOY MOLD AND PRODUCTS PRODUCED THEREBY

[75] Inventor: Kurt J. Becker, Newark, Del.

[73] Assignee: Lanxide Technology Company, LP, Newark, Del.

[21] Appl. No.: 269,295

[22] Filed: Nov. 10, 1988

[51] Int. Cl.$^5$ .............................................. B22D 19/14
[52] U.S. Cl. ........................................ 164/97; 164/98
[58] Field of Search ................... 164/80, 97, 98, 66.1, 164/67.1, 68.1, 100, 101, 102, 103, 104, 105

[56] References Cited

U.S. PATENT DOCUMENTS

| | | | |
|---|---|---|---|
| 2,951,771 | 9/1960 | Butler | 117/114 |
| 3,031,340 | 4/1962 | Girardot | 117/118 |
| 3,149,409 | 9/1964 | Maruhn | 29/156.5 |
| 3,364,976 | 1/1968 | Reding et al. | 164/98 |
| 3,396,777 | 8/1968 | Reding, Jr. | 164/97 |
| 3,547,180 | 12/1970 | Cochran et al. | 164/97 |
| 3,608,170 | 9/1971 | Larson et al. | 29/149.5 |
| 3,868,267 | 2/1975 | Gazza et al. | 264/60 X |
| 3,915,699 | 10/1975 | Umehara et al. | 419/17 |
| 3,969,553 | 7/1976 | Kondo et al. | 427/299 |
| 4,082,864 | 4/1978 | Kendall et al. | 427/248 |
| 4,376,803 | 3/1983 | Katzman | 428/408 |
| 4,376,804 | 3/1983 | Katzman | 428/408 |
| 4,404,262 | 9/1983 | Watmough | 428/539.5 |
| 4,450,207 | 5/1984 | Donomoto et al. | 428/614 |
| 4,473,103 | 9/1984 | Kenney et al. | 164/97 |
| 4,559,246 | 4/1985 | Jones | 427/299 |
| 4,570,316 | 2/1986 | Sakamaki et al. | 29/156.8 R |
| 4,587,177 | 5/1986 | Toaz et al. | 428/614 |
| 4,630,665 | 12/1986 | Novak | 164/97 |
| 4,657,065 | 4/1987 | Wada et al. | 164/461 |
| 4,662,429 | 5/1987 | Wada et al. | 164/461 |
| 4,673,435 | 6/1987 | Yamaguchi et al. | 75/235 |
| 4,677,901 | 7/1987 | Ban et al. | 92/213 |
| 4,679,493 | 7/1987 | Munro et al. | 92/212 |
| 4,713,111 | 12/1987 | Cameron et al. | 75/68 R |
| 4,731,298 | 3/1988 | Shindo et al. | 428/611 |
| 4,753,690 | 6/1988 | Wada et al. | 148/11.5 A |
| 4,802,524 | 2/1989 | Donomoto | 164/97 |
| 4,828,008 | 5/1989 | White et al. | 164/66.1 |
| 4,871,008 | 10/1989 | Dwivedi et al. | 164/6 |
| 4,932,099 | 6/1990 | Corwin | 164/97 |

FOREIGN PATENT DOCUMENTS

| | | |
|---|---|---|
| 0340957 | 11/1989 | European Pat. Off. . |
| 0364963 | 4/1990 | European Pat. Off. . |
| 2819076 | 10/1979 | Fed. Rep. of Germany . |
| 144441 | 8/1983 | Japan . |
| 2156718 | 10/1985 | United Kingdom . |

OTHER PUBLICATIONS

F. Delannay, L. Froyen, and A. Deruyttere, "Review: The Wetting of Solids by Molten Metals and Its Relation to the Preparation of Metal-Matrix Composites", Journal of Materials Science, vol. 22, No. 1, pp. 1–16, Jan. 1987.

A. Mortensen, M. N. Gungor, J. A. Cornie, and M. C. Flemings, "Alloy Microstructures in Cast Metal Matrix Composites", Journal of Metals, vol. 38, No. 3, pp. 30–35, Mar. 1986.

G. R. Edwards and D. L. Olson, "The Infiltration Kinetics of Aluminum in Silicon Carbide Compacts", Annual Report from Center for Welding Research, Colorado School of Mines, under ONR Contract No. M00014-85-K-0451, DTIC Report AD-A184 682, Jul. 1987.

Primary Examiner—Richard K. Seidel
Attorney, Agent, or Firm—Mark G. Mortenson; Michael K. Boyer

[57] ABSTRACT

The present invention relates to a novel method for forming metal matrix composite bodies, and the metal matrix composite bodies produced according to the novel method. Particularly, a permeable mass of filler material is formed into a preform by first forming a negative cavity in a matrix metal and thereafter placing said permeable mass of filler material into said cavity. An infiltration enhancer and/or an infiltration enhancer precursor and/or an infiltrating atmosphere are also in communication with the filler material, at least at some point along the process, which permit the matrix metal, when made molten, to spontaneously infiltrate the permeable mass of filler material, which at some point during the processing, may become self-supporting.

43 Claims, 1 Drawing Sheet

METHOD FOR MAKING METAL MATRIX COMPOSITES BY THE USE OF A NEGATIVE ALLOY MOLD AND PRODUCTS PRODUCED THEREBY

FIELD OF THE INVENTION

The present invention relates to a novel method for forming metal matrix composite bodies, and the metal matrix composite bodies produced according to the novel method. Particularly, a permeable mass of filler material is formed into a preform by first forming a negative cavity in a matrix metal and thereafter placing said permeable mass of filler material into said cavity. An infiltration enhancer and/or an infiltration enhancer precursor and/or an infiltrating atmosphere are also in communication with the filler material, at least at some point during the process, which permits the matrix metal, when made molten, to spontaneously infiltrate the permeable mass of filler material. At some point during the processing, the filler material becomes self-supporting.

BACKGROUND OF THE INVENTION

Composite products comprising a metal matrix and a strengthening or reinforcing phase such as ceramic particulates, whiskers, fibers or the like, show great promise for a variety of applications because they combine some of the stiffness and wear resistance of the reinforcing phase with the ductility and toughness of the metal matrix. Generally, a metal matrix composite will show an improvement in such properties as strength, stiffness, contact wear resistance, and elevated temperature strength retention relative to the matrix metal in monolithic form, but the degree to which any given property may be improved depends largely on the specific constituents, their volume or weight fraction, and how they are processed in forming the composite. In some instances, the composite may be lighter in weight than the matrix metal per se, and in other instances the composite may be heavier. Aluminum matrix metal composites reinforced with ceramics such as silicon carbide in particulate, platelet, or whisker form, for example, are of interest because of their higher stiffness, wear resistance and high temperature strength relative to aluminum.

Various metallurgical processes have been described for the fabrication of aluminum matrix composites, including methods based on powder metallurgy techniques and liquid-metal infiltration techniques which make use of pressure casting, vacuum casting, stirring, and wetting agents. With powder metallurgy techniques, the metal in the form of a powder and the reinforcing material in the form of a powder, whiskers, chopped fibers, etc., are admixed and then either cold-pressed and sintered, or hot-pressed. The maximum ceramic volume fraction in silicon carbide reinforced aluminum matrix composites produced by this method has been reported to be about 25 volume percent in the case of whiskers, and about 40 volume percent in the case of particulates.

The production of metal matrix composites by powder metallurgy techniques utilizing conventional processes imposes certain limitations with respect to the characteristics of the products attainable. The volume fraction of the ceramic phase in the composite is limited typically, in the case of particulates, to about 40 percent. Also, the pressing operation poses a limit on the practical size attainable. Only relatively simple product shapes are possible without subsequent processing (e.g., forming or machining) or without resorting to complex presses. Also, nonuniform shrinkage during sintering can occur, as well as nonuniformity of microstructure due to segregation in the compacts and grain growth.

U.S. Pat. No. 3,970,136, granted July 20, 1976, to J. C. Cannell et al., describes a process for forming a metal matrix composite incorporating a fibrous reinforcement, e.g. silicon carbide or alumina whiskers, having a predetermined pattern of fiber orientation. The composite is made by placing parallel mats or felts of coplanar fibers in a mold with a reservoir of molten matrix metal, e.g., aluminum, between at least some of the mats, and applying pressure to force molten metal to penetrate the mats and surround the oriented fibers. Molten metal may be poured onto the stack of mats while being forced under pressure to flow between the mats. Loadings of up to about 50 percent by volume of reinforcing fibers in the composite have been reported.

The above-described infiltration process, in view of its dependence on outside pressure to force the molten matrix metal through the stack of fibrous mats, is subject to the vagaries of pressure-induced flow processes, i.e., possible non-uniformity of matrix formation, porosity, etc. Non-uniformity of properties is possible even though molten metal may be introduced at a multiplicity of sites within the fibrous array. Consequently, complicated mat/reservoir arrays and flow pathways need to be provided to achieve adequate and uniform penetration of the stack of fiber mats. Also, the aforesaid pressure-infiltration method allows for only a relatively low reinforcement to matrix volume fraction to be achieved because of the difficulty inherent in infiltrating a large mat volume. Still further, molds are required to contain the molten metal under pressure, which adds to the expense of the process. Finally, the aforesaid process, limited to infiltrating aligned particles or fibers, is not directed to formation of aluminum metal matrix composites reinforced with materials in the form of randomly oriented particles, whiskers or fibers.

In the fabrication of aluminum matrix-alumina filled composites, aluminum does not readily wet alumina, thereby making it difficult to form a coherent product. Various solutions to this problem have been suggested. One such approach is to coat the alumina with a metal (e.g., nickel or tungsten), which is then hot-pressed along with the aluminum. In another technique, the aluminum is alloyed with lithium, and the alumina may be coated with silica. However, these composites exhibit variations in properties, or the coatings can degrade the filler, or the matrix contains lithium which can affect the matrix properties.

U.S. Pat. No. 4,232,091 to R. W. Grimshaw et al., overcomes certain difficulties in the art which are encountered in the production of aluminum matrix-alumina composites. This patent describes applying pressures of 75–375 kg/cm$^2$ to force molten aluminum (or molten aluminum alloy) into a fibrous or whisker mat of alumina which has been preheated to 700° to 1050° C. The maximum volume ratio of alumina to metal in the resulting solid casting was 0.25:1. Because of its dependency on outside force to accomplish infiltration, this process is subject to many of the same deficiencies as that of Cannell et al.

European Patent Application Publication No. 115,742 describes making aluminum-alumina composites, especially useful as electrolytic cell components, by filling the voids of a preformed alumina matrix with molten aluminum. The application emphasizes the non-wettability of alumina by aluminum, and therefore various techniques are employed to wet the alumina throughout the preform. For example, the alumina is coated with a wetting agent of a diboride of titanium, zirconium, hafnium, or niobium, or with a metal, i.e., lithium, magnesium, calcium, titanium, chromium, iron, cobalt, nickel, zirconium, or hafnium. Inert atmospheres, such as argon, are employed to facilitate wetting. This reference also shows applying pressure to cause molten aluminum to penetrate an uncoated matrix. In this aspect, infiltration is accomplished by evacuating the pores and then applying pressure to the molten aluminum in an inert atmosphere, e.g., argon. Alternatively, the preform can be infiltrated by vapor-phase aluminum deposition to wet the surface prior to filling the voids by infiltration with molten aluminum. To assure retention of the aluminum in the pores of the preform, heat treatment, e.g., at 1400° to 1800° C., in either a vacuum or in argon is required. Otherwise, either exposure of the pressure infiltrated material to gas or removal of the infiltration pressure will cause loss of aluminum from the body.

The use of wetting agents to effect infiltration of an alumina component in an electrolytic cell with molten metal is also shown in European Patent Application Publication No. 94353. This publication describes production of aluminum by electrowinning with a cell having a cathodic current feeder as a cell liner or substrate. In order to protect this substrate from molten cryolite, a thin coating of a mixture of a wetting agent and solubility suppressor is applied to the alumina substrate prior to start-up of the cell or while immersed in the molten aluminum produced by the electrolytic process. Wetting agents disclosed are titanium, zirconium, hafnium, silicon, magnesium, vanadium, chromium, niobium, or calcium, and titanium is stated as the preferred agent. Compounds of boron, carbon and nitrogen are described as being useful in suppressing the solubility of the wetting agents in molten aluminum. The reference, however, does not suggest the production of metal matrix composites, nor does it suggest the formation of such a composite in, for example, a nitrogen atmosphere.

In addition to application of pressure and wetting agents, it has been disclosed that an applied vacuum will aid the penetration of molten aluminum into a porous ceramic compact. For example, U.S. Pat. No. 3,718,441, granted Feb. 27, 1973, to R. L. Landingham, reports infiltration of a ceramic compact (e.g., boron carbide, alumina and beryllia) with either molten aluminum, beryllium, magnesium, titanium, vanadium, nickel or chromium under a lvacuum of less than $10^{-6}$ torr. A vacuum of $10^{-2}$ to $10^{-6}$ torr resulted in poor wetting of the ceramic by the molten metal to the extent that the metal did not flow freely into the ceramic void spaces. However, wetting was said to have improved when the vacuum was reduced to less than $10^{-6}$ torr.

U S. Pat. No. 3,864,154, granted Feb. 4, 1975, to G. E. Gazza et al., also shows the use of vacuum to achieve infiltration. This patent describes loading a cold-pressed compact of AlB12 powder onto a bed of cold-pressed aluminum powder. Additional aluminum was then positioned on the top of the $AlB_{12}$ powder compact. The crucible, loaded with the $AlB_{12}$ compact "sandwiched" between the layers of aluminum powder, was placed in a vacuum furnace. The furnace was evacuated to approximately $10^{-5}$ torr to permit outgassing. The temperature was subsequently raised to 1100° C. and maintained for a period of 3 hours. At these conditions, the molten aluminum penetrated the porous $AlB_{12}$ compact.

U.S. Pat. No. 3,364,976, granted Jan. 23, 1968 to John N. Reding et al., discloses the concept of creating a self-generated vacuum in a body to enhance penetration of a molten metal into the body. Specifically, it is disclosed that a body, e.g., a graphite mold, a steel mold, or a porous refractory material, is entirely submerged in a molten metal. In the case of a mold, the mold cavity, which is filled with a gas reactive with the metal, communicates with the externally located molten metal through at least one orifice in the mold. When the mold is immersed into the melt, filling of the cavity occurs as the self-generated vacuum is produced from the reaction between the gas in the cavity and the molten metal. Particularly, the vacuum is a result of the formation of a solid oxidized form of the metal. Thus, Reding et al. discloses that it is essential to induce a reaction between gas in the cavity and the molten metal. However, utilizing a mold to create a vacuum may be undesirable because of the inherent limitations associated with use of a mold. Molds must first be machined into a particular shape; then finished, machined to produce an acceptable casting surface on the mold; then assembled prior to their use; then disassembled after their use to remove the cast piece therefrom; and thereafter reclaim the mold, which most likely would include refinishing surfaces of the mold or discarding the mold if it is no longer acceptable for use. Machining of a mold into a complex shape can be very costly and time-consuming. Moreover, removal of a formed piece from a complex-shaped mold can also be difficult (i.e., cast pieces having a complex shape could be broken when removed from the mold). Still further, while there is a suggestion that a porous refractory material can be immersed directly in a molten metal without the need for a mold, the refractory material would have to be an integral piece because there is no provision for infiltrating a loose or separated porous material absent the use of a container mold (i.e., it is generally believed that the particulate material would typically disassociate or float apart when placed in a molten metal). Still further, if it was desired to infiltrate a particulate material or loosely formed preform, precautions should be taken so that the infiltrating metal does not displace at least portions of the particulate or preform resulting in a non-homogeneous microstructure.

Accordingly, there has been a long felt need for a simple and reliable process to produce shaped metal matrix composites which does not rely upon the use of applied pressure or vacuum (whether externally applied or internally created), or damaging wetting agents to create a metal matrix embedding another material such as a ceramic material. Moreover, there has been a long felt need to minimize the amount of final machining operations needed to produce a metal matrix composite body. The present invention satisfies these needs by providing a spontaneous infiltration mechanism for infiltrating a material (e.g., a ceramic material), which can be formed into a preform, with molten matrix metal (e.g., aluminum) in the presence of an infiltrating atmosphere (e.g., nitrogen) under normal atmospheric pressures so long as an infiltration enhancer is present at least at some point during the process.

DESCRIPTION OF COMMONLY OWNED U.S. PATENT APPLICATIONS

The subject matter of this application is related to that of several other copending and co-owned patent applications. Particularly, these other copending patent applications describe novel methods for making metal matrix composite materials (hereinafter sometimes referred to as "Commonly Owned Metal Matrix Patent Applications").

A novel method of making a metal matrix composite material is disclosed in Commonly Owned U.S. Ser. No. 049,171, filed May 13, 1987, in the names of White et al., and entitled "Metal Matrix Composites", now allowed in the United States. According to the method of the White et al. invention, a metal matrix composite is produced by infiltrating a permeable mass of filler material (e.g., a ceramic or a ceramic-coated material) with molten aluminum containing at least about 1 percent by weight magnesium, and preferably at least about 3 percent by weight magnesium. Infiltration occurs spontaneously without the application of external pressure or vacuum. A supply of the molten metal alloy is contacted with the mass of filler material at a temperature of at least 675° C. in the presence of a gas comprising from about 10 to 100 percent, and preferably at least about 50 percent, nitrogen by volume, and a remainder of the gas, if any, being a nonoxidizing gas, e.g., argon. Under these conditions, the molten aluminum alloy infiltrates the ceramic mass under normal atmospheric pressures to form an aluminum (or aluminum alloy) matrix composite. When the desired amount of filler material has been infiltrated with the molten aluminum alloy, the temperature is lowered to solidify the alloy, thereby forming a solid metal matrix structure that embeds the reinforcing filler material. Usually, and preferably, the supply of molten alloy delivered will be sufficient to permit the infiltration to proceed essentially to the boundaries of the mass of filler material. The amount of filler material in the aluminum matrix composites produced according to the White et al. invention may be exceedingly high. In this respect, filler to alloy volumetric ratios of greater than 1:1 may be achieved.

Under the process conditions in the aforesaid White et al. invention, aluminum nitride can form as a discontinuous phase dispersed throughout the aluminum matrix. The amount of nitride in the aluminum matrix may vary depending on such factors as temperature, alloy composition, gas composition and filler material. Thus, by controlling one or more such factors in the system, it is possible to tailor certain properties of the composite. For some end use applications, however, it may be desirable that the composite contain little or substantially no aluminum nitride.

It has been observed that higher temperatures favor infiltration but render the process more conducive to nitride formation. The White et al. invention allows the choice of a balance between infiltration kinetics and nitride formation.

An example of suitable barrier means for use with metal matrix composite formation is described in Commonly Owned and Copending U.S. Ser. No. 141,642, filed Jan. 7, 1988, in the names of Michael K. Aghajanian et al., and entitled "Method of Making Metal Matrix Composite with the use of a Barrier". According to the method of this Aghajanian et al. invention, a barrier means (e.g., particulate titanium diboride or a graphite material such as a flexible graphite tape product sold by Union Carbide under the tradename Grafoil®) is disposed on a defined surface boundary of a filler material and matrix alloy infiltrates up to the boundary defined by the barrier means. The barrier means is used to inhibit, prevent, or terminate infiltration of the molten alloy, thereby providing net, or near net, shapes in the resultant metal matrix composite. Accordingly, the formed metal matrix composite bodies have an outer shape which substantially corresponds to the inner shape of the barrier means.

The method of U.S. Ser. No. 049,171 was improved upon by Commonly Owned and Copending U.S. Ser. No. 168,284, filed March 15, 1988, in the names of Michael K. Aghajanian and Marc S. Newkirk and entitled "Metal Matrix Composites and Techniques for Making the Same". In accordance with the methods disclosed in this U.S. Pat. Application, a matrix metal alloy is present as a first source of metal and as a reservoir of matrix metal alloy which communicates with the first source of molten metal due to, for example, gravity flow. Particularly, under the conditions described in this patent application, the first source of molten matrix alloy begins to infiltrate the mass of filler material under normal atmospheric pressures and thus begins the formation of a metal matrix composite. The first source of molten matrix metal alloy is consumed during its infiltration into the mass of filler material and, if desired, can be replenished, preferably by a continuous means, from the reservoir of molten matrix metal as the spontaneous infiltration continues. When a desired amount of permeable filler has been spontaneously infiltrated by the molten matrix alloy, the temperature is lowered to solidify the alloy, thereby forming a solid metal matrix structure that embeds the reinforcing filler material. It should be understood that the use of a reservoir of metal is simply one embodiment of the invention described in this patent application and it is not necessary to combine the reservoir embodiment with each of the alternate embodiments of the invention disclosed therein, some of which could also be beneficial to use in combination with the present invention.

The reservoir of metal can be present in an amount such that it provides for a sufficient amount of metal to infiltrate the permeable mass of filler material to a predetermined extent. Alternatively, an optional barrier means can contact the permeable mass of filler on at least one side thereof to define a surface boundary.

Moreover, while the supply of molten matrix alloy delivered should be at least sufficient to permit spontaneous infiltration to proceed essentially to the boundaries (e.g., barriers) of the permeable mass of filler material, the amount of alloy present in the reservoir could exceed such sufficient amount so that not only will there be a sufficient amount of alloy for complete infiltration, but excess molten metal alloy could remain and be attached to the metal matrix composite body. Thus, when excess molten alloy is present, the resulting body will be a complex composite body (e.g., a macrocomposite), wherein an infiltrated ceramic body having a metal matrix therein will be directly bonded to excess metal remaining in the reservoir.

Each of the above-discussed Commonly Owned Metal Matrix Pat. Applications describes methods for the production of metal matrix composite bodies and novel metal matrix composite bodies which are produced therefrom. The entire disclosures of all of the foregoing Commonly Owned Metal Matrix Patent Applications are expressly incorporated herein by reference.

SUMMARY OF THE INVENTION

A metal matrix composite body is produced by infiltrating a permeable mass of filler material which, at some point during the processing, may become self-supporting (i.e., may be formed into a preform). Specifically, the permeable mass of filler material can be made into a preform by first forming a cavity in a matrix metal, which cavity is then filled with a filler material. The cavity may be suitably formed to replicate a shape desired for the metal matrix composite body. The filler material may become self-supporting by being exposed to, for example, elevated temperatures and/or a bonding agent, and/or a reactant, etc. Thereafter, the matrix metal which forms the cavity, when made molten, spontaneously infiltrates the filler material which retains the shape of the cavity in the metal to form a metal matrix composite body.

The cavity in the matrix metal can be formed by various techniques discussed herein. However, the cavity should be capable of receiving and holding a filler material such that when the filler material is placed into the cavity, the filler material conforms substantially to the shape of the cavity. Moreover, the filler material, at least at some point during the processing, should be contacted with at least one of an infiltration enhancer and/or an infiltration enhancer precursor and/or an infiltrating atmosphere. For example, an infiltration enhancer and/or an infiltration enhancer precursor could be mixed with the filler material and/or be located on a surface of the cavity and/or be supplied by the matrix metal and/or be supplied by the infiltrating atmosphere. The combination of the filler material, matrix metal, and one or more of the infiltration enhancer precursor and/or infiltration enhancer and/or infiltrating atmosphere causes the matrix metal to spontaneously infiltrate the preform which has a shape which substantially conforms to the cavity formed in the matrix metal.

The cavity in the matrix metal can be formed by techniques such as machining the cavity from an ingot of matrix metal, assembling a plurality of pieces or ingots of matrix metal such that a cavity is formed when such a plurality is assembled, casting the matrix metal about a mandrel, leaching at least a portion of the matrix metal by an appropriate caustic material, preferentially heating at least a portion of the matrix metal and thereby melting a portion of the matrix metal; and/or any combination of these or other techniques which could result in a cavity being formed in the matrix metal.

In a preferred embodiment, a rubber mold is formed around a shaped mandrel which corresponds substantially to the metal matrix composite body which is to be produced. For example, the shaped mandrel may be a metal, clay or plastic embodiment of the desired metal matrix composite body to be formed. The mandrel is then removed from the rubber mold thereby forming a cavity in the rubber mold which substantially corresponds in size and shape to the mandrel. The cavity in the rubber mold is thereafter filled with a material which can conform to the shape of the cavity and, when processed, can form a high temperature mandrel. For example, a mixture of plaster of Paris and a particulate ceramic material could be used to form a high temperature mandrel. The high temperature mandrel is then placed within a suitable refractory vessel and molten matrix metal is poured around the high temperature mandrel. Thus, it will be understood that the high temperature mandrel must have sufficient strength and shape integrity to resist thermal, mechanical and chemical effects which arise from its contacting molten matrix metal and from the cooling of molten matrix metal around it. Moreover, the mandrel should be substantially non-reactive with the matrix metal.

The molten matrix metal is permitted to solidify around the high temperature mandrel and, once solidified, the high temperature mandrel should be removable from the solidified matrix metal. For example, the high temperature mandrel may be removed from the matrix metal by techniques such as dissolving the high temperature mandrel with a liquid, preferentially sand blasting or grit blasting the high temperature mandrel from the metal, machining the mandrel from the matrix metal, and/or any combination of these or other techniques suitable for removing the high temperature mandrel from the surrounding matrix metal.

It is noted that this application discusses primarily aluminum matrix metals which, at some point during the formation of the metal matrix composite body, are contacted with magnesium, which functions as the infiltration enhancer precursor, in the presence of nitrogen, which functions as the infiltrating atmosphere. Thus, the matrix metal/infiltration enhancer precursor/infiltrating atmosphere system of aluminum/magnesium/nitrogen exhibits spontaneous infiltration. However, other matrix metal/infiltration enhancer precursor/infiltrating atmosphere systems may also behave in a manner similar to the system aluminum/magnesium/nitrogen. For example, similar spontaneous infiltration behavior has been observed in the aluminum/strontium/nitrogen system; the aluminum/zinc/oxygen system; and the aluminum/calcium/nitrogen system. Accordingly, even though the aluminum/magnesium/nitrogen system is discussed primarily herein, it should be understood that other matrix metal/infiltration enhancer precursor/infiltrating atmosphere systems may behave in a similar manner.

When the matrix metal comprises an aluminum alloy, the cavity in the aluminum alloy can be filled with a ceramic filler material (e.g., alumina or silicon carbide particles). In a first preferred embodiment, the filler material has admixed therewith, or at some point during the process is exposed to, magnesium, as an infiltration enhancer precursor. Moreover, the aluminum alloy and/or the filler material at some point during the processing is exposed to a nitrogen atmosphere, as an infiltrating atmosphere, and in a preferred embodiment such exposure occurs during substantially all of the processing, thereby converting the infiltration enhancer precursor to an infiltration enhancer. Still further, at some point during the processing, the preform will become at least partially self-supporting. In a preferred embodiment, the preform becomes self-supporting before or substantially simultaneous with the matrix metal becoming molten. In an alternative embodiment, the filler material can be directly provided in the filler material, thereby obviating the requirement for an infiltrating atmosphere. Moreover, infiltration enhancer or infiltration enhancer precursor can be provided in the matrix metal or in the alloy, in addition to or in lieu of being provided in the filler. Thus, the preform will be spontaneously infiltrated. The extent or rate of spontaneous infiltration and formation of metal matrix will vary with a given set of process conditions including, for example, the concentration of magnesium provided to the system (e.g., in the aluminum alloy and/or in the filler material and/or in the infiltrating atmosphere), the size and/or composition of the particles in the preform, the concentration of nitrogen in the infiltrating atmosphere, the time permitted for infiltration, and/or the temperature at which infiltration occurs. Spontaneous infiltration typically occurs to an extent sufficient to embed substantially completely the preform.

DEFINITIONS

"Aluminum", as used herein, means and includes essentially pure metal (e.g., a relatively pure, commercially available unalloyed aluminum) or other grades of metal and metal alloys such as the commercially available metals having impurities and/or alloying constituents such as iron, silicon, copper, magnesium, manganese, chromium, zinc, etc., therein. An aluminum alloy for purposes of this definition is an alloy or intermetallic compound in which aluminum is the major constituent.

"Balance Non-Oxidizinq Gas", as used herein, means that any gas present in addition to the primary gas comprising the infiltrating atmosphere is either an inert gas or a reducing gas which is substantially non-reactive with the matrix metal under the process conditions. Any oxidizing gas which may be present as an impurity in the gas(es) used should be insufficient to oxidize the matrix metal to any substantial extent under the process conditions.

"Barrier" or "barrier means", as used herein, means any suitable means which interferes, inhibits, prevents or terminates the migration, movement, or the like, of molten matrix metal beyond a surface boundary of a permeable mass of filler material or preform, where such surface boundary is defined by said barrier means. Suitable barrier means may be any such material, compound, element, composition, or the like, which, under the process conditions, maintains some integrity and is not substantially volatile (i.e., the barrier material does not volatilize to such an extent that it is rendered nonfunctional as a barrier).

Further, suitable "barrier means" includes materials which are substantially non-wettable by the migrating molten matrix metal under the process conditions employed. A barrier of this type appears to exhibit substantially little or no affinity for the molten matrix metal, and movement beyond the defined surface boundary of the mass of filler material or preform is prevented or inhibited by the barrier means. The barrier reduces any final machining or grinding that may be required and defines at least a portion of the surface of the resulting metal matrix composite product. The barrier may in certain cases be permeable or porous, or rendered permeable by, for example, drilling holes or puncturing the barrier, to permit gas to contact the molten matrix metal.

"Carcass" or "Carcass of Matrix Metal", as used herein, refers to any of the original body of matrix metal remaining which has not been consumed during formation of the metal matrix composite body, and typically, if allowed to cool, remains in at least partial contact with the metal matrix composite body which has been formed. It should be understood that the carcass may also include a second or foreign metal therein.

"Filler", as used herein, is intended to include either single constituents or mixtures of constituents which are substantially non-reactive with and/or of limited solubility in the matrix metal and may be single or multiphase. Fillers may be provided in a wide variety of forms, such as powders, flakes, platelets, microspheres, whiskers, bubbles, etc., and may be either dense or porous. "Filler" may also include ceramic fillers, such as alumina or silicon carbide as fibers, chopped fibers, particulates, whiskers, bubbles, spheres, fiber mats, or the like, and ceramic-coated fillers such as carbon fibers coated with alumina or silicon carbide to protect the carbon from attack, for example, by a molten aluminum parent metal. Fillers may also include metals.

"Hiqh Temoerature Mandrel", as used herein, means a body formed of a material which can be shaped into a replica of a desired metal matrix composite body and, at a temperature at which matrix metal is molten, can substantially maintain its shape. Moreover, the high temperature mandrel should be capable of surviving any chemical or physical attack by molten matrix metal when molten matrix metal is directly contacted therewith; for example, the high temperature mandrel should be capable of withstanding any compressive stress exerted by matrix metal cooling around the mandrel. The mandrel, preferably, should be conveniently removable from the matrix metal once the matrix metal has solidified around the mandrel.

"Infiltratinq Atmosohere", as used herein, means that atmosphere which is present which interacts with the matrix metal and/or preform (or filler material) and/or infiltration enhancer precursor and/or infiltration enhancer and permits or enhances spontaneous infiltration of the matrix metal to occur.

"Infiltration Enhancer", as used herein, means a material which promotes or assists in the spontaneous infiltration of a matrix metal into a filler material or preform. An infiltration enhancer may be formed from, for example, a reaction of an infiltration enhancer precursor with an infiltrating atmosphere to form (1) a gaseous species and/or (2) a reaction product of the infiltration enhancer precursor and the infiltrating atmosphere and/or (3) a reaction product of the infiltration enhancer precursor and the filler material or preform. Moreover, the infiltration enhancer may be supplied directly to at least one of the preform, and/or matrix metal, and/or infiltrating atmosphere and function in a substantially similar manner to an infiltration enhancer which has formed as a reaction between an infiltration enhancer precursor and another species. Ultimately, at least during the spontaneous infiltration the infiltration enhancer should be located in at least a portion of the filler material or preform to achieve spontaneous infiltration.

"Infiltration Enhancer Precursor" or "Precursor to the Infiltration Enhancer", as used herein, means a material which when used in combination with the matrix metal, preform and/or infiltrating atmosphere forms an infiltration enhancer which induces or assists the matrix metal to spontaneously infiltrate the filler material or preform. Without wishing to be bound by any particular theory or explanation, it appears as though it may be necessary for the precursor to the infiltration enhancer to be capable of being positioned, located or transportable to a location which permits the infiltration enhancer precursor to interact with the infiltrating atmosphere and/or the preform or filler material and/or metal. For example, in some matrix metal/infiltration enhancer precursor/infiltrating atmosphere systems, it is desirable for the infiltration enhancer precursor to volatilize at, near, or in some cases, even somewhat above the temperature at which the matrix metal becomes molten. Such volatilization may lead to: (1) a reaction of the infiltration enhancer precursor with the infiltrating atmosphere to form a gaseous species which enhances wetting of the filler material or preform by the matrix metal; and/or (2) a reaction of the infiltration enhancer precursor with the infiltrating atmosphere to form a solid, liquid or gaseous infiltration enhancer in at least a portion of the filler material or preform which enhances wetting; and/or (3) a reaction of the infiltration enhancer precursor within the filler material or preform which forms a solid, liquid or gaseous infiltration enhancer in at least a portion of the filler material or preform which enhances wetting.

"Mandrel", as used herein, means a body having a shape which substantially replicates the desired shape of a metal matrix composite body.

"Matrix Metal" or "Matrix Metal Alloy", as used herein, means that metal which is utilized to form a metal matrix composite (e.g., before infiltration) and/or that material which is intermingled with a filler material to form a metal matrix composite body (e.g., after infiltration). When a specified metal is mentioned as the matrix metal, it should be understood that such matrix metal includes that metal as an essentially pure metal, a commercially available metal having impurities and/or alloying constituents therein, an intermetallic compound or an alloy in which that metal is the major or predominant constituent.

"Matrix Metal/Infiltration Enhancer Precursor/Infiltratinq Atmosohere System" or "Spontaneous SYstem", as used herein, refers to that combination of materials which exhibits spontaneous infiltration into a preform or filler material. It should be understood that whenever virgules ("/") appear between an exemplary matrix metal, infiltration enhancer precursor and infiltrating atmosphere, the virgules are used to designate a system or combination of materials which, when combined in a particular manner, exhibits spontaneous infiltration into a preform or filler material.

"Metal Matrix Composite" or "MMC", as used herein, means a material comprising a two- or three-dimensionally interconnected alloy or matrix metal which has embedded a preform or filler material. The matrix metal may include various alloying elements to provide specifically desired mechanical and physical properties in the resulting composite.

A Metal "Different" from the Matrix Metal means a metal which does not contain, as a primary constituent, the same metal as the matrix metal (e.g., if the primary constituent of the matrix metal is aluminum, the "different" metal could have a primary constituent of, for example, nickel).

"Preform" or "Permeable Preform", as used herein, means a porous mass of filler or filler material which is manufactured with at least one surface boundary which essentially defines a boundary for infiltrating matrix metal, such mass retaining sufficient shape integrity and green strength to provide dimensional fidelity prior to being infiltrated by the matrix metal. The mass should be sufficiently porous to accommodate spontaneous infiltration of the matrix metal thereinto. A preform typically comprises a bonded array or arrangement of filler, either homogeneous or heterogeneous, and may be comprised of any suitable material (e.g., ceramic and/or metal particulates, powders, fibers, whiskers, etc., and any combination thereof). A preform may exist either singularly or as an assemblage.

"Refractory Boat", as used herein, means any vessel or material which can house or contain the spontaneous system under the process conditions and not react with any of the constituents of the spontaneous system in a manner which would be significantly detrimental to the spontaneous infiltration mechanism.

"Reservoir", as used herein, means a separate body of matrix metal positioned relative to a mass of filler or a preform so that, when the metal is molten, it may flow to replenish, or in some cases to initially provide and subsequently replenish, that portion, segment or source of matrix metal which is in contact with the filler or preform.

"Spontaneous Infiltration", as used herein, means the infiltration of matrix metal into the permeable mass of filler or preform occurs without requirement for the application of pressure or vacuum (whether externally applied or internally created).

"System Purifier", as used herein, means any suitable material which when used in combination with the spontaneous system can purify the infiltrating atmosphere to remove any constituents in the infiltrating atmosphere or any constituents which evolve from the spontaneous system which could adversely affect the spontaneous infiltration mechanism.

BRIEF DESCRIPTION OF THE FIGURES

The following Figures are provided to assist in understanding the invention, but are not intended to limit the scope of the invention. Similar reference numerals have been used wherever possible in each of the Figures to denote like components, wherein.

DETAILED DESCRIPTION OF THE INVENTION AND PREFERRED EMBODIMENTS

The present invention relates to forming a metal matrix composite body by forming a cavity in a matrix metal body and filling the cavity with a filler material which, at some point during the process, is formed into a preform which is at least partially self-supporting. At least one of an infiltration enhancer and/or infiltration enhancer precursor and/or an infiltrating atmosphere should be supplied to the matrix metal body and/or the preform so that spontaneous infiltration of the matrix metal into the preform can occur.

Figure 1:
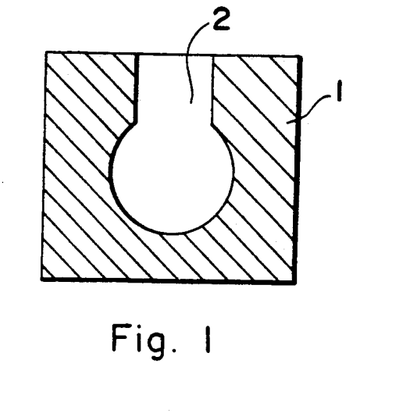
FIG. 1 is a cross-section of a matrix metal body having a cavity defined therein corresponding to a desired preform configuration.

Referring to FIG. 1, there is shown a body (1) of matrix metal defining a cavity (2). The shape of the cavity (2) preferably replicates the shape of a desired finished metal matrix composite body. One or more of several techniques for producing the shaped cavity (2) may be employed as determined by, for example, the complexity of the composite body and the composition of the matrix metal. A suitable cavity can be produced by machining a matrix metal body, for example, by end mill, electric discharge and other processes. For more complex composite body shapes, it may be preferable to form the cavity (2) by forming or casting the matrix metal body (1) around a suitable high temperature mandrel which replicates the shape desired for the composite.

A high temperature mandrel can be produced by forming a body of suitable material around a replica or mandrel of the desired composite shape. Such a replica might be a metal, plaster, clay, plastic or other model or even a previously formed matrix composite body. One suitable material for use at this stage is silicone rubber; other materials such as stiffenable potting compounds, paraffin wax and the like, which may become rigid under processing conditions, may also be used. Once the body of suitable material, e.g., silicone rubber, is formed, the replica is removed therefrom and the resulting cavity can be used in the formation of a high temperature mandrel.

Specifically, the cavity can be filled with a hardenable material capable of faithfully replicating the dimensions of the cavity and having other desirable characteristics discussed further below. One such hardenable material is plaster of Paris. It will be understood that the result of the foregoing steps in this embodiment is the production of a high temperature mandrel which faithfully replicates the shape desired for the finished metal matrix composite body.

In forming the matrix metal body (1) around a high temperature mandrel formed of plaster of Paris, it is advantageous to dry the mandrel thoroughly, for example by baking it. The high temperature mandrel may then be positioned appropriately in a nonreactive refractory container into which is poured molten matrix metal. Upon cooling, the body (1) is formed and the high temperature mandrel removed. In the case of a plaster of Paris high temperature mandrel, the mandrel can be removed by rehydrating the mandrel with a stream of water. Other techniques for removing the high temperature mandrel, thereby leaving the cavity (2) in the matrix metal body (1), can be used in accordance with the composition of the mandrel.

Figure 2:
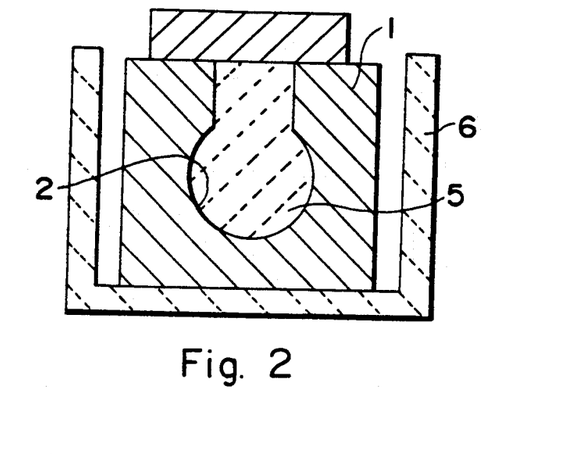
FIG. 2 shows a refractory boat containing a matrix metal body filled with filler material in accordance with the present invention.

Referring to FIG. 2, after formation of the body (1) and cavity (2), the cavity (2) is filled with a desired filler (5) into which matrix metal will be spontaneously infiltrated. As discussed in greater detail below, the filler (5) may comprise any of the filler materials which are elements of the spontaneous systems, including as elements the matrix metal comprising the body (1) or a second or additional matrix metal. The filler may also include the appropriate infiltration enhancer and/or infiltration enhancer precursor, and/or one or both of these may be included in the matrix metal and/or in the infiltrating atmosphere.

The filler (5) and matrix metal body (1) may then be placed in a refractory boat (6) which is heated by suitable means such as an electric resistance-heated furnace. An appropriate infiltrating atmosphere is preferably maintained in the interior of the boat (6) to permit the spontaneous infiltration process to proceed. It will be understood that an inert atmosphere sufficient to prevent degradation of the spontaneous system may instead be provided in the boat 6 if an infiltration enhancer is otherwise provided to the spontaneous system.

Figure 3:
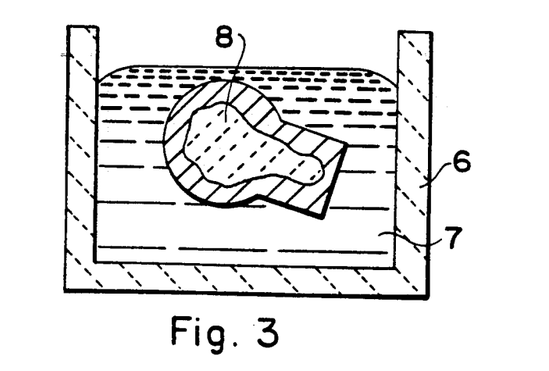
FIG. 3 illustrates the boat including a pool of molten matrix metal and a preform.
Figure 4:
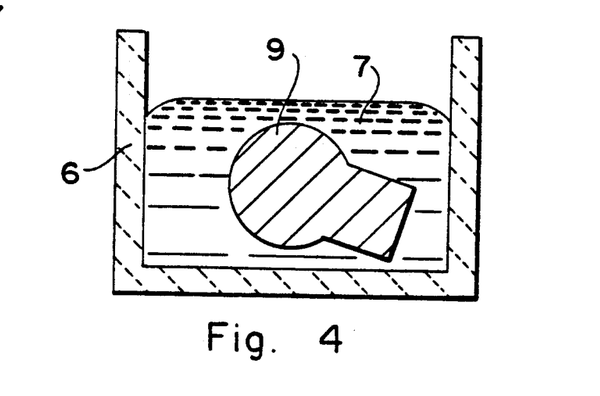
FIG. 4 illustrates the boat, matrix metal pool and a fully spontaneously infiltrated metal matrix composite body therein.

Referring to FIG. 3, the boat (6) is suitably heated, thereby liquefying the matrix metal body (1) into a pool (7) of matrix metal. Before liquification of the matrix metal body (1), the filler should be converted into a preform (8). Such conversion may occur in situ during heating of the body (1) to form pool (7) in the presence of the infiltrating or inert atmosphere, whether by sintering or other chemical reaction of the filler as discussed elsewhere herein. For example, the filler may be mixed initially with an infiltration enhancer precursor which, when heated in the presence of an infiltrating atmosphere, may be at least partially converted to an infiltration enhancer that binds the filler into a preform. Upon formation of the pool (7) the matrix metal can then spontaneously infiltrate the preform (8), eventually forming a metal matrix composite body (9) illustrated in FIG. 4. It will be understood that infiltration can spontaneously occur through all surfaces of the preform exposed to the matrix metal.

In order to effect spontaneous infiltration of the matrix metal into the preform, an infiltration enhancer should be provided to the spontaneous system. An infiltration enhancer could be formed from an infiltration enhancer precursor which could be provided (1) in the matrix metal; and/or (2) in the preform; and/or (3) from an infiltrating atmosphere; and/or (4) from an external source into the spontaneous system. Moreover, rather than supplying an infiltration enhancer precursor, an infiltration enhancer may be supplied directly to at least one of the preform, and/or matrix metal, and/or infiltrating atmosphere. Ultimately, at least during the spontaneous infiltration, the infiltration enhancer should be located in at least a portion of the filler material or preform.

In a preferred embodiment it is possible that the infiltration enhancer precursor can be at least partially reacted with the infiltrating atmosphere such that infiltration enhancer can be formed in at least a portion of the preform prior to or substantially simultaneous with contacting the preform with the molten matrix metal (e.g., if magnesium was the infiltration enhancer precursor and nitrogen was the infiltrating atmosphere, the infiltration enhancer could be magnesium nitride which would be located in at least a portion of the preform).

An example of a matrix metal/infiltration enhancer precursor/infiltrating atmosphere system is the aluminum/magnesium nitrogen system. Specifically, an aluminum matrix metal body, having a cavity therein, can be filled with an appropriate filler material. The filler material, preferably in the presence of at least one of an infiltration enhancer precursor or an infiltration enhancer, can assume and maintain the shape of the cavity in the matrix metal prior to the matrix metal becoming molten. In this case, a shaped preform of filler material will result and will contact the molten matrix metal. The formed preform may float adjacent to or on a surface of the molten matrix metal, or be disposed elsewhere within the molten matrix metal, due to its natural buoyancy relative to the molten matrix metal. However, ultimately, at least during the spontaneous infiltration, the infiltration enhancer should be located on or in at least a portion of the filler material or preform.

Under the conditions employed in the method of the present invention, in the case of an aluminum/magnesium/nitrogen spontaneous infiltration system, the preform should be sufficiently permeable to permit the nitrogen-containing gas to penetrate or permeate the preform at least at some point during the process and contact the molten matrix metal. Moreover, the permeable preform can accommodate infiltration of the molten matrix metal, thereby causing the nitrogen-permeated preform to be infiltrated spontaneously with molten matrix metal to form a metal matrix composite body and/or cause the nitrogen to react with an infiltration enhancer precursor to form infiltration enhancer in the preform, and thereby resulting in spontaneous infiltration. The extent of spontaneous infiltration and formation of the metal matrix composite will vary with a given set of process conditions, including the magnesium content of the aluminum matrix metal alloy and/or the preform, the amount of magnesium nitride in the preform and/or the aluminum matrix metal, the presence of additional alloying elements (e.g., silicon, iron, copper, manganese, chromium, zinc, and the like), average size (e.g., particle diameter) of the filler material comprising the preform, the surface condition and type of filler material, the nitrogen concentration of the infiltrating atmosphere, the time permitted for infiltration and the temperature at which infiltration occurs.

For example, for infiltration of the molten aluminum matrix metal to occur spontaneously, the aluminum can be alloyed with at least about 1 percent by weight, and preferably at least about 3 percent by weight, magnesium (which functions as the infiltration enhancer precursor), based on alloy weight. Auxiliary alloying elements, as discussed above, may also be included in the matrix metal to tailor specific properties thereof. Additionally, the auxiliary alloying elements may affect the minimum amount of magnesium required in the matrix aluminum metal to result in spontaneous infiltration of the filler material or preform.

Loss of magnesium from the spontaneous system due to, for example, volatilization should be avoided to the extent that some magnesium remains to form infiltration enhancer. Thus, it is desirable to utilize a sufficient amount of initial alloying elements to assure that spontaneous infiltration will not be affected by volatilization. Further, the presence of magnesium in both the preform and matrix metal or the preform alone may result in a lesser required amount of magnesium to achieve spontaneous infiltration (discussed in greater detail later herein). The volume percent of nitrogen in the nitrogen atmosphere also affects formation rates of the metal matrix composite body. Specifically, if less than about 10 volume percent of nitrogen is present in the atmosphere, very slow or little spontaneous infiltration will occur. It has been discovered that it is preferable for at least about 50 volume percent of nitrogen to be present in the atmosphere, thereby resulting in, for example, a much more rapid rate of infiltration.

The minimum magnesium content required for the molten matrix metal to infiltrate a filler material or preform depends on one or more variables such as the processing temperature, time, the presence of auxiliary alloying elements such as silicon or zinc, the nature of the filler material, the location of the magnesium in one or more components of the spontaneous system, and the nitrogen content of the atmosphere. Lower temperatures or shorter heating times can be used to obtain complete infiltration as the magnesium content of the matrix metal alloy and/or preform is increased. Also, for a given magnesium content, the addition of certain auxiliary alloying elements such as zinc permits the use of lower temperatures. For example, a magnesium content of the matrix metal at the lower end of the operable range, e.g., from about 1 to 3 weight percent, may be used in conjunction with at least one of the following: an above-minimum processing temperature, a high nitrogen concentration, or one or more auxiliary alloying elements. When no magnesium is added to the preform, matrix metal alloys containing from about 3 to 5 weight percent magnesium are preferred on the basis of their general utility over a wide variety of process conditions, with at least about 5 percent being preferred when lower temperatures and shorter times are employed. Magnesium contents in excess of about 10 percent by weight of the aluminum alloy may be employed to moderate the temperature conditions required for infiltration.

The magnesium content may be reduced when used in conjunction with an auxiliary alloying element, but these elements serve an auxiliary function only and are used together with at least the above-specified minimum amount of magnesium. For example, there was substantially no infiltration of nominally pure aluminum alloyed only with 10 percent silicon at 1000° C. into a bedding of 500 mesh, 39 Crystolon (99 percent pure silicon carbide from Norton Co.). However, in the presence of magnesium, silicon has been found to promote the infiltration process. In addition, the amount of magnesium varies if it is supplied exclusively to the preform or filler material. It has been discovered that spontaneous infiltration will occur with a lesser weight percent of magnesium supplied to the system when at least some of the total amount of magnesium supplied is placed in the preform or filler material. It may be desirable for a lesser amount of magnesium to be provided in order to prevent the formation of undesirable intermetallics in the metal matrix composite body. In the case of a silicon carbide preform contacted with an aluminum matrix metal, it has been discovered that the preform containing at least about 1 percent by weight magnesium and being in the presence of a substantially pure nitrogen atmosphere is spontaneously infiltrated by the matrix metal. In the case of an alumina preform, the amount of magnesium required to achieve acceptable spontaneous infiltration is slightly higher. Specifically, it has been found that an alumina preform, when contacted with a similar aluminum matrix metal at about the same temperature as the aluminum that infiltrated into the silicon carbide preform and in the presence of the same nitrogen atmosphere, may require at least about 3 percent by weight magnesium to achieve similar spontaneous infiltration.

It is also noted that it is possible to supply to the spontaneous system infiltration enhancer precursor and/or infiltration enhancer on a surface of the alloy and/or on a surface of the preform or filler material and/or within the preform or filler material prior to infiltrating the matrix metal into the filler material or preform (i.e., it may not be necessary for the supplied infiltration enhancer or infiltration enhancer precursor to be alloyed with the matrix metal, but rather, simply supplied to the spontaneous system). If the magnesium was applied to a surface of the matrix metal it may be preferred that said surface should be the surface which is closest to, or preferably in contact with, the permeable mass of filler material or vice versa; or such magnesium could be mixed into at least a portion of the preform or filler material. Still further, it is possible that some combination of surface application, alloying and placement of magnesium into at least a portion of the preform could be used. Such combination of applying infiltration enhancer(s) and/or infiltration enhancer precursor(s) could result in a decrease in the total weight percent of magnesium needed to promote infiltration of the matrix aluminum metal into the preform, as well as achieving lower temperatures at which infiltration can occur. Moreover, the amount of undesirable intermetallics formed due to the presence of magnesium could also be minimized.

The use of one or more auxiliary alloying elements and the concentration of nitrogen in the surrounding gas also affects the extent of nitriding of the matrix metal at a given temperature. For example, auxiliary alloying elements such as zinc or iron included in the alloy, or placed on a surface of the alloy, may be used to reduce the infiltration temperature and thereby decrease the amount of nitride formation, whereas increasing the concentration of nitrogen in the gas may be used to promote nitride formation.

The concentration of magnesium in the alloy, and/or placed onto a surface of the alloy, and/or combined in the filler or preform material, also tends to affect the extent of infiltration at a given temperature. Consequently, in some cases where little or no magnesium is contacted directly with the preform or filler material, it may be preferred that at least about three weight percent magnesium be included in the matrix metal alloy. Alloy contents of less than this amount, such as one weight percent magnesium, may require higher process temperatures or an auxiliary alloying element for infiltration. The temperature required to effect the spontaneous infiltration process of this invention may be lower: (1) when the magnesium content of the alloy alone is increased, e.g., to at least about 5 weight percent; and/or (2) when alloying constituents are mixed with the permeable mass of filler material or preform; and/or (3) when another element such as zinc or iron is present in the aluminum alloy. The temperature also may vary with different filler materials. In general, spontaneous and progressive infiltration will occur at a process temperature of at least about 675° C., and preferably a process temperature of at least about 750°–800° C. Temperatures generally in excess of 1200° C. do not appear to benefit the process, and a particularly useful temperature range has been found to be from about 675° C. to about 1200° C. However, as a general rule, the spontaneous infiltration temperature is a temperature which is above the melting point of the matrix metal but below the volatilization temperature of the matrix metal. Moreover, the spontaneous infiltration temperature should be below the melting point of the filler material. Still further, as temperature is increased, the tendency to form a reaction product between the matrix metal and infiltrating atmosphere increases (e.g., in the case of aluminum matrix metal and a nitrogen infiltrating atmosphere, aluminum nitride may be formed). Such reaction product may be desirable or undesirable based upon the intended application of the metal matrix composite body. Additionally, electric resistance heating is typically used to achieve the infiltrating temperatures. However, any heating means which can cause the matrix metal to become molten and does not adversely affect spontaneous infiltration, is acceptable for use with the invention.

In the present method, for example, a permeable mass of filler material which, at some point during the processing, may become self-supporting (i.e., be formed into a preform) is placed into contact with molten aluminum in the presence of, at least sometime during the process, a nitrogen-containing gas. The permeable mass of filler material may include an infiltration enhancer precursor and/or an infiltration enhancer. The nitrogen-containing gas may be supplied by maintaining a continuous flow of gas into contact with at least one of the filler material (preform) and molten aluminum matrix metal. Although the flow rate of the nitrogen-containing gas is not critical, it is preferred that the flow rate be sufficient to compensate for any nitrogen lost from the atmosphere due to nitride formation in the alloy matrix, and also to prevent or inhibit the incursion of air which can have an oxidizing effect on the molten matrix metal and/or the infiltration enhancer and/or the infiltration enhancer precursor.

The present method of forming a metal matrix composite is applicable to a wide variety of filler materials, and the choice of filler materials will depend on such factors as the matrix metal alloy, the process conditions, the reactivity of the molten matrix metal alloy with the filler material, and the properties sought for the final metal matrix composite product. For example, when aluminum is the matrix metal, suitable filler materials include (a) oxides, e.g., alumina; (b) carbides, e.g., silicon carbide; (c) borides, e.g., aluminum dodecaboride, and (d) nitrides, e.g., aluminum nitride. If there is a tendency for the filler material to react with the molten aluminum matrix metal, this might be accommodated by minimizing the infiltration time and temperature or by providing a non-reactive coating on the filler. The filler material may comprise a substrate, such as carbon or other non-ceramic material, bearing a ceramic coating to protect the substrate from attack or degradation. Suitable ceramic coatings include oxides, carbides, borides and nitrides. Ceramics which are preferred for use in the present method include alumina and silicon carbide in the form of particles, platelets, whiskers and fibers. The fibers can be discontinuous (in chopped form) or in the form of continuous filament, such as multifilament tows. Further, the ceramic mass or preform may be homogeneous or heterogeneous.

It also has been discovered that certain filler materials exhibit enhanced infiltration relative to filler materials by having a similar chemical composition. For example, crushed alumina bodies made by the method disclosed in U.S. Pat. No. 4,713,360, entitled "Novel Ceramic Materials and Methods of Making Same", which issued on Dec. 15, 1987, in the names of Marc S. Newkirk et al., exhibit desirable infiltration properties relative to commercially available alumina products. Moreover, crushed alumina bodies made by the method disclosed in Copending and Commonly Owned Application Ser. No. 819,397, entitled "Composite Ceramic Articles and Methods of Making Same", in the names of Marc S. Newkirk et al., also exhibit desirable infiltration properties relative to commercially available alumina products. The subject matter of each of the issued Patent and Copending Patent Application is herein expressly incorporated by reference. Thus, it has been discovered that complete infiltration of a permeable mass of ceramic material can occur at lower infiltration temperatures and/or lower infiltration times by utilizing a crushed or comminuted body produced by the method of the aforementioned U.S. Patent and Patent Application.

The size and shape of the filler material can be any that may be required to achieve the properties desired in the composite. Thus, the material may be in the form of particles, whiskers, platelets or fibers since infiltration is not restricted by the shape of the filler material. Other shapes such as spheres, tubules, pellets, refractory fiber cloth, and the like may be employed. In addition, the size of the material does not limit infiltration, although a higher temperature or longer time period may be needed for complete infiltration of a mass of smaller particles than for larger particles. Further, the mass of filler material (shaped into a preform) to be infiltrated should be permeable, i.e., permeable at least to the molten matrix metal, and possibly to the infiltrating atmosphere.

The method of forming metal matrix composites according to the present invention, not being dependent on the use of pressure to force or squeeze molten matrix metal into a preform or a mass of filler material, permits the production of substantially uniform metal matrix composites having a high volume fraction of filler material and low porosity. Higher volume fractions of filler material may be achieved by using a lower porosity initial mass of filler material. Higher volume fractions also may be achieved if the mass of filler is compacted or otherwise densified provided that the mass is not converted into either a compact with close cell porosity or into a fully dense structure that would prevent infiltration by the molten alloy.

It has been observed that for aluminum infiltration and matrix formation around a filler, wetting of the filler by the aluminum matrix metal may be an important part of the infiltration mechanism. Moreover, at low processing temperatures, a negligible or minimal amount of metal nitriding occurs resulting in a minimal discontinuous phase of aluminum nitride dispersed in the metal matrix. However, as the upper end of the temperature range is approached, nitridation of the metal is more likely to occur. Thus, the amount of the nitride phase in the metal matrix can be controlled by varying the processing temperature at which infiltration occurs. The specific process temperature at which nitride formation becomes more pronounced also varies with such factors as the matrix aluminum alloy used and its quantity relative to the volume of filler or preform, the filler material to be infiltrated, and the nitrogen concentration of the infiltrating atmosphere. For example, the extent of aluminum nitride formation at a given process temperature is believed to increase as the ability of the alloy to wet the filler decreases and as the nitrogen concentration of the atmosphere increases.

It is therefore possible to tailor the constituency of the metal matrix during formation of the metal matrix composite to impart certain characteristics to the resulting product. For a given system, the process conditions can be selected to control the nitride formation. A composite product containing an aluminum nitride phase will exhibit certain properties which can be favorable to, or improve the performance of, the product. Further, the temperature range for spontaneous infiltration with an aluminum alloy may vary with the ceramic material used. In the case of alumina as the filler material, the temperature for infiltration should preferably not exceed about 1000° C. if it is desired that the ductility of the matrix not be reduced by the significant formation of nitride. However, temperatures exceeding 1000° C. may be employed if it is desired to produce a composite with a less ductile and stiffer matrix. To infiltrate silicon carbide, higher temperatures of about 1200° C. may be employed since the aluminum alloy nitrides to a lesser extent, relative to the use of alumina as filler, when silicon carbide is employed as a filler material.

Moreover, it is possible to use a reservoir of matrix metal to assure complete infiltration of the filler material and/or to supply a second metal which has a different composition from the first source of matrix metal. For example, the size of the body of matrix metal may be insufficient to assure complete infiltration of the preform; thus, the body of matrix metal can be introduced to a preexisting larger pool or reservoir of matrix metal that would melt the body of matrix metal, thereby permitting spontaneous infiltration to occur. Further, in some cases it may be desirable to utilize a matrix metal in the reservoir which differs in composition from the first source of matrix metal comprising the body of matrix metal. For example, if an aluminum alloy is used as the first source of matrix metal, then virtually any other metal or metal alloy which was molten at the processing temperature could be used as the reservoir metal. Molten metals frequently are very miscible with each other which would result in the reservoir metal mixing with the first source of matrix metal so long as an adequate amount of time is given for the mixing to occur. Thus, by using a reservoir metal which is different in composition than the first source of matrix metal, it is possible to tailor the properties of the metal matrix to meet various operating requirements and thus tailor the properties of the metal matrix composite.

A barrier means may also be utilized in combination with the present invention. Specifically, the barrier means for use with this invention may be any suitable means which interferes, inhibits, prevents or terminates the migration, movement, or the like, of molten matrix alloy (e.g., an aluminum alloy) beyond the defined surface boundary of the filler material. Suitable barrier means may be any material, compound, element, composition, or the like, which, under the process conditions of this invention, maintains some integrity, is not volatile and preferably is permeable to the gas used with the process as well as being capable of locally inhibiting, stopping, interfering with, preventing, or the like, continued infiltration or any other kind of movement beyond the defined surface boundary of the ceramic filler. Such materials are graphite and other forms of carbon, and various ceramics, e.g., oxides, borides, and the like.

A barrier means may be provided on one or more surfaces of the preform to assist the preform in retaining its shape or otherwise to protect the preform and/or the metal matrix composite body during processing. Specifically, if the preform is formed in accordance with FIGS. 1 and 2, the cavity (2) of body (1) could be lined or coated with a suitable barrier to further support the preform or to enhance its net shape characteristics after infiltration. A barrier means can be shaped as appropriate to provide a rugged surface for grasping or otherwise removing the metal matrix composite body from the molten matrix metal yet still provide the advantages of composite formation with a minimum of subsequent shape preparation.

Various demonstrations of the present invention are included in the Examples immediately following. However, these Examples should be considered as being illustrative and not be construed as limiting the scope of the invention as defined in the appended claims.

EXAMPLE 1

A conventional steel gear approximately 7.6 centimeters in diameter was used as a replica or mandrel for a finished metal matrix composite body. The gear was embedded in a body of GI-1000 rubber molding compound (available from Plastic Tooling Supply Co.) by pouring the compound around the gear and letting it set. The gear was then carefully removed from the set compound thereby forming a cavity therein. This cavity was filled with a mixture of approximately equal portions of plaster of Paris (e.g., available from Bondex Co.) and aluminum dioxide (El Alundum, available from Norton Co.). The aluminum dioxide rendered the plaster more cement-like, although its presence and proportion in the mixture are not critical because any rehydratable plaster can be used. Moreover, the ratio of plaster of Paris/aluminum dioxide can be varied (e.g., 30/70 to 70/30).

Upon hardening, the plaster comprised a high temperature mandrel which was removed from the rubber molding compound. The high temperature mandrel was placed in a furnace and thoroughly dried at 200° C. for a period of about 2 hours. After drying, the high temperature mandrel was placed in a 316 stainless steel can, about 15 cm tall and 10 cm in diameter, lined with graphite (e.g., Permafoil ®, available from T.T. America Co.). A graphite rod was set atop the high temperature mandrel to act as ballast, and the can including the high temperature mandrel was preheated to about 300° C. Molten aluminum alloy at a temperature of 800° C. was then poured into the can over the high temperature mandrel, and the sides of the can were tapped in an effort to remove bubbles from the molten metal. The composition of the alloy was about 77 weight percent aluminum, about 12 weight percent silicon, about 5 weight percent zinc and about 6 weight percent magnesium, by weight (i.e., Al-12Si5Zn-6Mg) It will be understood that the composition of t selected in accordance with the filler material to be used or the characteristics desired for the final composite body.

The can was allowed to cool for a few minutes, thereby solidifying the aluminum alloy around the high temperature mandrel, and the solid alloy body was removed from the can. The mandrel was then rewet with water, thereby softening it and allowing it to be washed out of the solidified aluminum alloy. The cavity remaining in the alloy retained the shape of the gear, and the alloy body was thoroughly dried by heating to about 150° C. for about 1 hour.

The cavity was then packed by hand with a filler comprising a mixture of 1000 mesh silicon carbide powder (39 Crystolon from Norton Co.) and about 2 weight percent of 325 mesh magnesium powder. Additional magnesium powder was sprinkled at the surface of the filled cavity; this excess magnesium accelerated the spontaneous infiltration but is not necessary to the process. It is also sometimes helpful to dust the interior of the cavity with magnesium prior to packing with filler.

The alloy body including the packed filler in the shape of the gear was returned to the graphite-lined steel can. A number of cleaned aluminum alloy ingots of the same alloy composition were added to the can, and placed in contact with the surface of the filled cavity. These ingots were cleaned by grit-blasting and washing in a solvent such as ethanol to remove cutting oils and any other organic compounds. The number of ingots is not critical; provided a sufficient quantity of alloy is provided to obtain the desired amount of spontaneous infiltration.

At the top of the alloy ingots was added a small graphite (e.g., Permafoil ®) open boat in the shape of a box that contained a pea-sized mass of titanium (4 mesh×30 mesh, odd-shaped particle size, available from Chemalloy Co., Inc.). The titanium acted as a system purifier, i.e., an oxygen getter, for the process.

The can was then covered with a thin copper foil which was crimped around the edges of the can, partially sealing it. A stainless steel tube was introduced through the foil and, after the can was placed in a suitable furnace, substantially pure nitrogen gas was ducted through the tube at a flow rate of 0.4 liters/minute or greater, purging the interior of the can, and the temperature of the furnace was raised to about 120° C. After approximately 1 hour, the electric-resistance-heated furnace was heated from about 120° C. to a temperature of about 800° C. over a time period of about 12 hours, then maintained at about 800° C. for about 12 hours. It has been found that at temperatures of approximately 500° C. to 600° C., the filler in the alloy cavity rigidizes into a preform, probably through magnesium nitride formation and/or sintering. When the alloy body and ingots melt, the alloy spontaneously infiltrates the preform from all surfaces exposed to the alloy, thereby providing the advantages of thorough, rapid infiltration.

The resulting metal matrix composite gear was removed from the can after first draining the excess molten alloy through an orifice in the bottom of the can. Any slag which may be present on the surface of the alloy pool is preferably removed before draining, although any slag adhering to the metal matrix composite can be removed subsequently by, for example, grit blasting the composite. After draining, the metal matrix composite gear was allowed to air cool. The composite obtained was fully infiltrated and it showed very good shape fidelity to the steel gear mandrel.

EXAMPLE 2

The procedure described in Example 1 was followed, although a shape configured to a leaf from a maple tree was used as a replica or mandrel rather than the steel gear. In addition, after formation of the cavity in the aluminum alloy body, the cavity was sandblasted before being dusted with 325 mesh magnesium powder and filled with the filler. The sand-blasting roughened the alloy and thereby facilitated adherence of the magnesium powder to the alloy. By ensuring the presence of magnesium and/or magnesium nitride at the interface between the eventual molten alloy and rigidized preform in this way, thorough spontaneous infiltration even at the edges and points of the leaf was assured.

Nitrogen gas purged the interior of the steel can at a flow rate of about 2.5 liters/minute, and the interior of the can was maintained at about 750° C. (corresponding to a furnace temperature of about 800° C.) for about 2 hours after the furnace temperature had been ramped up over a period of about 2 hours. The infiltrated composite was then removed while hot. To achieve more uniform heating of the can by the furnace, the the outer diameter of the can was wrapped in a 3-mm thick layer of amorphous silica matting (Fiberfrax ®, available from McNeil Refractories, Inc.).

Further, it was found that in this Example it was desirable for the alloy cavity and the filler to be disposed at the bottom of the steel can because the preform was sufficiently buoyant prior to spontaneous infiltration to float to the surface of the pool of molten alloy. Although spontaneous infiltration occurred at the surface, the combination of the surface tension of the pool and viscosity and the leaf's broad shape kept the infiltrated preform at the surface of the pool where it was likely to be damaged during slag removal. It will be noted that composites having other shapes and buoyancies may not remain at the surface of the alloy pool.

The metal matrix composite leaf produced in this manner showed very good shape fidelity and thorough spontaneous infiltration.

What is claimed is:

1. A method for making a metal matrix composite, comprising:
   forming a cavity in a solid matrix metal;
   placing a substantially non-reactive filler in the cavity;
   inducing the filler to become self-supporting and to conform substantially to the shape of the cavity;
   melting the matrix metal; and
   spontaneously infiltrating at least a portion of the filler with the molten matrix metal thereby forming a metal matrix composite body.

2. The method of claim 1, further comprising the step of providing an infiltrating atmosphere, wherein the infiltrating atmosphere communicates with at least one of the filler, preform and the matrix metal for at least a portion of the period of infiltration.

3. The method of claim 2, wherein the infiltrating atmosphere comprises an atmosphere selected from the group consisting of oxygen and nitrogen.

4. The method of claim 2, wherein the matrix metal is melted in a refractory vessel which contains the infiltrating atmosphere.

5. The method of claim 2, further comprising the step of supplying at least one of an infiltration enhancer precursor and an infiltration enhancer to at least one of the matrix metal, the filler, preform and the infiltrating atmosphere.

6. The method of claim 5, wherein the infiltration enhancer precursor comprises a material selected from the group consisting of magnesium, strontium and calcium.

7. The method of claim 5, wherein the matrix metal comprises aluminum, the infiltration enhancer precursor comprises at least one material selected from the group consisting of magnesium, strontium and calcium, and the infiltrating atmosphere comprises nitrogen.

8. The method of claim 5, wherein the matrix metal comprises aluminum, the infiltration enhancer precursor comprises zinc, and the infiltrating atmosphere comprises oxygen.

9. The method of claim 5, wherein the infiltration enhancer is formed by reacting an infiltration enhancer precursor and at least one species comprising at least one member selected from the group consisting of the infiltrating atmosphere, a reactive material added to the filler and the matrix metal.

10. The method of claim 9, wherein during infiltration, the infiltration enhancer precursor volatilizes.

11. The method of claim 10, wherein the volatilized infiltration enhancer precursor reacts to form a reaction product in at least a portion of the filler or preform.

12. The method of claim 11, wherein said reaction product is at least partially reducible by said molten matrix metal.

13. The method of claim 12, wherein said reaction product coats at least a portion of said filler or preform.

14. The method of claim 5, wherein the at least one of the infiltration enhancer precursor and infiltration enhancer is supplied to the filler and causes the filler to be self-supporting when heated in the presence of the infiltrating atmosphere.

15. The method of claim 5, wherein said at least one of the infiltration enhancer precursor and infiltration enhancer is supplied from an external source.

16. The method of claim 5, wherein said at least one of said infiltration enhancer precursor and infiltration enhancer is provided in at least one of said matrix metal, said filler or preform and said infiltrating atmosphere.

17. The method of claim 1, further comprising the step of supplying at least one of an infiltration enhancer precursor and an infiltration enhancer to at least one of the matrix metal, the filler, and the preform.

18. The method of claim 17, wherein said at least one of said infiltration enhancer and said infiltration enhancer precursor is provided at a boundary between said filler and said matrix metal.

19. The method of claim 17, wherein said at least one of said infiltration enhancer precursor and infiltration enhancer is provided in both of said matrix metal and said filler or preform.

20. The method of claims 1 or 17, wherein the filler is induced to become self-supporting by exposing the filler to at least one of heat source and a bonding agent.

21. The method of claims 1 or 17, wherein the filler becomes self-supporting substantially simultaneously with or before the melting of the matrix metal.

22. The method of claims 1 or 17, wherein the cavity is formed by machining an ingot of matrix metal, 23. The method of claims 1 or 17, wherein the cavity is formed by assembling a plurality of shaped pieces of matrix metal.

24. The method of claims 1 or 17, wherein the cavity is formed by casting matrix metal about a mandrel.

25. The method of claims 1 or 17, wherein the cavity is formed by leaching away a portion of an ingot of matrix metal.

26. The method of claims 1 or 17, wherein the cavity is formed by preferentially melting away a portion of an ingot of matrix metal.

27. The method of claims 1 or 17, where the cavity is formed by forming a rubber mold around a mandrel having a shape desired for the metal matrix composite body, removing the mandrel from the rubber mold, filling the rubber mold with a refractory material, forming a refractory mandrel from the refractory material, solidifying molten matrix metal around the refractory mandrel and removing the refractory mandrel from the solidified matrix metal.

28. The method of claim 27, wherein the refractory material comprises plaster of Paris.

29. The method of claim 1, further comprising the step of contacting at least a portion of the filler or preform with at least one of an infiltration enhancer precursor and an infiltration enhancer during at least a portion of the period of infiltration.

30. The method of claim 1, wherein the filler comprises at least one material selected from the group consisting of powders, flakes, platelets, microspheres, whiskers, bubbles, fibers, particulates, fiber mats, chopped fibers, spheres, pellets, tubules and refractory cloths.

31. The method of claim 1, wherein the filler is of limited solubility in the molten matrix metal.

32. The method of claim 1, wherein the filler comprises at least one ceramic material.

33. The method of claim 1, wherein an infiltration enhancer precursor is alloyed in said matrix metal.

34. The method of claim 1, wherein said matrix metal comprises aluminum and at least one alloying element selected from the group consisting of silicon, iron, copper, manganese, chromium, zinc, calcium, magnesium and strontium.

35. The method of claim 1, wherein the temperature during spontaneous infiltration is greater than the melting point of the matrix metal, but lower than the volatilization temperature of the matrix metal and the melting point of the filler or preform.

36. The method of claim 1, wherein the matrix metal comprising aluminum and the filler comprises at least one material selected from the group consisting of oxides, carbides, borides and nitrides.

37. The method of claim 1, wherein the filler caused to be self-supporting by at least partially sintering the filler.

38. A method for making a metal matrix composite body comprising:
    forming a cavity in a solid matrix metal;
    placing a substantially non-reactive filler into said cavity;
    providing an infiltrating atmosphere which contacts said filler;
    providing at least one of an infiltration enhancer and an infiltration enhancer precursor in said filler to permit spontaneous infiltration of the matrix metal alloy into the filler to occur;
    causing the filler to become self-supporting;
    heating the matrix metal to render it molten;
    spontaneously infiltrating at least a portion of the self-supporting filler with the molten matrix metal to a desired extent; and
    cooling said molten matrix metal within said self-supporting filler material, thereby forming a metal matrix composite body.

39. A method for making a metal matrix composite body comprising:
    forming a cavity in a solid matrix metal;
    filling the cavity with a permeable filler and at least one of an infiltration enhancer precursor and infiltration enhancer to form a preform;
    rendering the preform self-supporting;
    removing the preform from the cavity by causing said solid matrix to become molten; and
    spontaneously infiltrating the preform with molten matrix metal.

40. The method of any claim 1, 38, or 39, further comprising the step of defining a surface boundary of the filler or preform with a barrier, by placing said barrier in said cavity prior to placing said filler therein wherein the matrix metal spontaneously infiltrates up to the barrier.

41. The method of claim 40, wherein the barrier comprises a material selected from the group consisting of graphite and titanium diboride.

42. The method of claim 40, wherein the barrier is substantially non-wettable by said matrix metal.

43. The method of claim 4, wherein the barrier comprises at least one metal which permits communication between an infiltrating atmosphere and at least one of the matrix metal, filler or preform, infiltration enhancer and infiltration enhancer precursor.

* * * * *

UNITED STATES PATENT AND TRADEMARK OFFICE
CERTIFICATE OF CORRECTION

PATENT NO. : 5,004,036

DATED : April 2, 1991

INVENTOR(S) : Kurt J. Becker

It is certified that error appears in the above-identified patent and that said Letters Patent is hereby corrected as shown below:

| | | |
|---|---|---|
| Column 3, | line 55: | change "Ivacuum" to --vacuum--; |
| | line 64: | change "AlB12" to --AlB$_{12}$--. |
| Column 9, | line 22: | change "Non-Oxidizinq" to --Non-Oxidizing--. |
| Column 10, | line 12: | change ""Hiqh Temoerature" to --"High Temperature--; |
| | line 26: | change ""Infiltratinq Atmosohere"" to --"Infiltrating Atmosphere"--. |
| Column 11, | line 30: | change "tratinq Atmosohere" to --trating Atmosphere--; change "SYs-" to --Sys- --. |
| Column 13, | line 11: | delete "stiffenable". |
| Column 21, | line 1: | change "dioxide" to --oxide--; |
| | line 2: | change "dioxide" to --oxide--; |
| | line 6: | change "plaster" to --Plaster--; change "dioxide" to --oxide--; |
| | line 26: | change "(i.e., Al-12Si5Zn-6Mg)" to --(i.e., Al-12 Si-5Zn-6Mg)--; |
| | line 27: | change "t" to --the alloy may be--. |
| Column 22, | line 50: | change "the the" to --the--. |
| Column 24, | line 22: | change the comma at the end of the sentence to a period. |

UNITED STATES PATENT AND TRADEMARK OFFICE
CERTIFICATE OF CORRECTION

PATENT NO. : 5,004,036
DATED : April 2, 1991
INVENTOR(S) : Kurt J. Becker

It is certified that error appears in the above-indentified patent and that said Letters Patent is hereby corrected as shown below:

Column 25, line 8, after "filler" insert --is --.

Column 26, line 26, change "4" to --40 --.

Signed and Sealed this

Nineteenth Day of December, 1995

Attest:

BRUCE LEHMAN

*Attesting Officer*     *Commissioner of Patents and Trademarks*